(12) United States Patent
Su

(10) Patent No.: US 9,644,402 B1
(45) Date of Patent: May 9, 2017

(54) USB LOCK FOR ELECTRONIC DEVICES

(71) Applicant: Jason Su, Changhua (TW)

(72) Inventor: Jason Su, Changhua (TW)

(73) Assignee: INGMAR CO. LTD., Changhua (TW)

( * ) Notice: Subject to any disclaimer, the term of this patent is extended or adjusted under 35 U.S.C. 154(b) by 0 days.

(21) Appl. No.: 15/233,670

(22) Filed: Aug. 10, 2016

(51) Int. Cl.
*E05B 73/00* (2006.01)
*G06F 21/88* (2013.01)
*H01R 24/62* (2011.01)
*H01R 13/639* (2006.01)
*H01R 107/00* (2006.01)

(52) U.S. Cl.
CPC ...... *E05B 73/0082* (2013.01); *E05B 73/0005* (2013.01); *G06F 21/88* (2013.01); *H01R 13/6397* (2013.01); *H01R 24/62* (2013.01); *H01R 2107/00* (2013.01)

(58) Field of Classification Search
CPC .. E05B 73/0082; E05B 73/0085; G06F 21/88; H01R 13/60; H01R 13/639; H01R 13/6271; H01R 13/6273; H01R 13/6275; H01R 13/6397; H01R 2107/00
USPC .......... 439/270, 134, 350, 352, 354
See application file for complete search history.

(56) References Cited

U.S. PATENT DOCUMENTS

| | | | | |
|---|---|---|---|---|
| 6,991,479 B2 * | 1/2006 | Miao | ........................ | G06F 21/85 439/133 |
| 7,160,137 B1 * | 1/2007 | Yeh | ..................... | H01R 13/6397 439/358 |
| 7,428,834 B1 * | 9/2008 | Lee | .......................... | E05B 67/36 439/133 |
| 8,014,130 B1 * | 9/2011 | Nguyen | ............... | H01R 13/447 361/600 |
| 9,362,673 B1 * | 6/2016 | Rinker | ............... | H01R 13/6275 |
| 2003/0224637 A1 * | 12/2003 | Ling | .................. | H01R 13/6397 439/133 |
| 2005/0039502 A1 * | 2/2005 | Avganim | ................ | G06F 21/32 70/58 |

* cited by examiner

*Primary Examiner* — Tulsidas C Patel
*Assistant Examiner* — Travis Chambers
(74) *Attorney, Agent, or Firm* — Che-Yang Chen; Law Offices of Scott Warmuth

(57) ABSTRACT

A USB lock for an electronic device may comprise an inner casing, an outer casing, a USB connector and a driving unit. The inner casing has a front opening to secure the USB connector thereon. A rear portion of the inner casing has a tube body, and a first through hole penetrating through the tube body is communicated with the front opening and configured to receive the driving unit with a lock rod and a key lock. The USB lock of the present invention is configured to engage with a USB port of a 3C product to achieve the anti-theft effect, which is easily to assembly, simplifies the structure, lowers manufacturing cost and prevents the 3C product from getting infected with a virus through an unsafe USB.

4 Claims, 6 Drawing Sheets

USB LOCK FOR ELECTRONIC DEVICES

FIELD OF THE INVENTION

The present invention relates to a lock for electronic devices, and more particularly to a lock with a USB connector for anti-theft purpose and lowering manufacturing cost for an electronic device.

BACKGROUND OF THE INVENTION

Nowadays, it is common to see 3C products such as desktop computers and laptops which are used for education or other purposes and placed in computer classrooms, libraries, offices, shopping malls or other public places. However, because of small volume, the 3C products, especially laptops, are easily to be moved or stolen. Thus, the 3C products are always locked through various kinds of locks.

However, the conventional lock for electronic device has following disadvantages: (i) there are so many kinds of locks in the market, and each of locks has different and complicated components or mechanisms thus increasing the manufacturing costs; (ii) a lock connector or a lock hole in different laptops are different thereby lowering the practicability, not to mention the fact that some laptops have no lock connector; (iii) when the laptops are used in the public, the data stored therein may be stolen by people with bad intention through a USB or a portable external hard drive; and (iv) the electronic device is prone to get infected with a virus through an unsafe USB. Therefore, there remains a need for a new and improved design for a USB lock for electronic device to overcome the problems presented above.

SUMMARY OF THE INVENTION

The present invention provides a USB lock for an electronic device which comprises an inner casing, an outer casing, a USB connector and a driving unit. A head portion is formed at a front end of the inner casing, and a front opening is located at a front end of the head portion. A rear portion of the inner casing has a tube body, and a first through hole penetrating through the tube body is communicated with the front opening. The tube body further has a locating hole. The outer casing covers around an outer periphery of the tube body of the inner casing, and a connecting ring disposed on the tube body is secured between the head portion and the outer casing. Furthermore, a first connecting hole penetrating an outer periphery of the outer casing is located a position aligned with the locating hole of the inner casing, and a bolt is inserted into the first connecting hole and the locating hole to secure the outer casing around the tube body. The USB connector is secured on the front opening of the inner casing, and a square tube of the USB connector protrudes from a front end of the front opening. A first surface of the square tube further comprises an actuated opening, and a bottom portion, a tilted portion and a hooking member are sequentially extended from an edge of the actuated opening. The bottom portion is located at the same height level as the first surface of the square tube, and the tilted portion is extended toward an interior space of the square tube. Moreover, the areas of the bottom portion and the tilted portion are in a ratio between 1:3 and 1:4, and the hooking member is bent toward the actuated opening. A front end of the driving unit comprises a lock piece which is configured to locate inside the interior space of the USB connector, and an evading opening penetrating through a first surface of the lock piece is located at a position corresponding to the tilted portion and the hooking member. A connecting portion formed at a rear end of the driving unit is configured to connect to a lock rod. Furthermore, the lock rod penetrates and connects to a key lock, and the lock rod with the key lock is secured inside the first through hole of the inner casing.

In one embodiment, a protruding portion protrudes from an inner surface of the first through hole of the inner casing, and at least a second through hole penetrating through a rear edge of the USB connector is configured to connect with the protruding portion such that the USB connector is firmly connected to the inner casing.

In another embodiment, the connecting portion of the driving unit comprises a housing slot which is configured to receive and engage with a block of the lock rod such that the lock rod is configured to rotate relative to a rear end of the connecting portion and to push or pull the driving unit.

In still another embodiment, a locking cable connected to the connecting ring is configured to wind around an immovable object to achieve a burglarproof effect.

Comparing with conventional 3C product locks, the present invention is advantageous because: (i) the USB lock of the present invention is configured to engage with the USB port of a 3C product to achieve the anti-theft effect, which is easily to assembly, simplifies the structure and lowers manufacturing cost; (ii) through cooperating the USB connector with the key lock, the USB lock of the present invention is configured to lock a 3C product, even the 3C product has no lock hole thereby improving the practicability and preventing the 3C product from getting infected with a virus through an unsafe USB; and (iii) since the design of the bottom portion, the tilted portion and the hooking member which are sequentially extended from the edge of the actuated opening of the USB connector and the areas of the bottom portion and the tilted portion are in the ratio between 1:3 and 1:4, the lock piece is configured to push the tilted portion with a greater distance thereby enhancing the durability and stability of operation.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
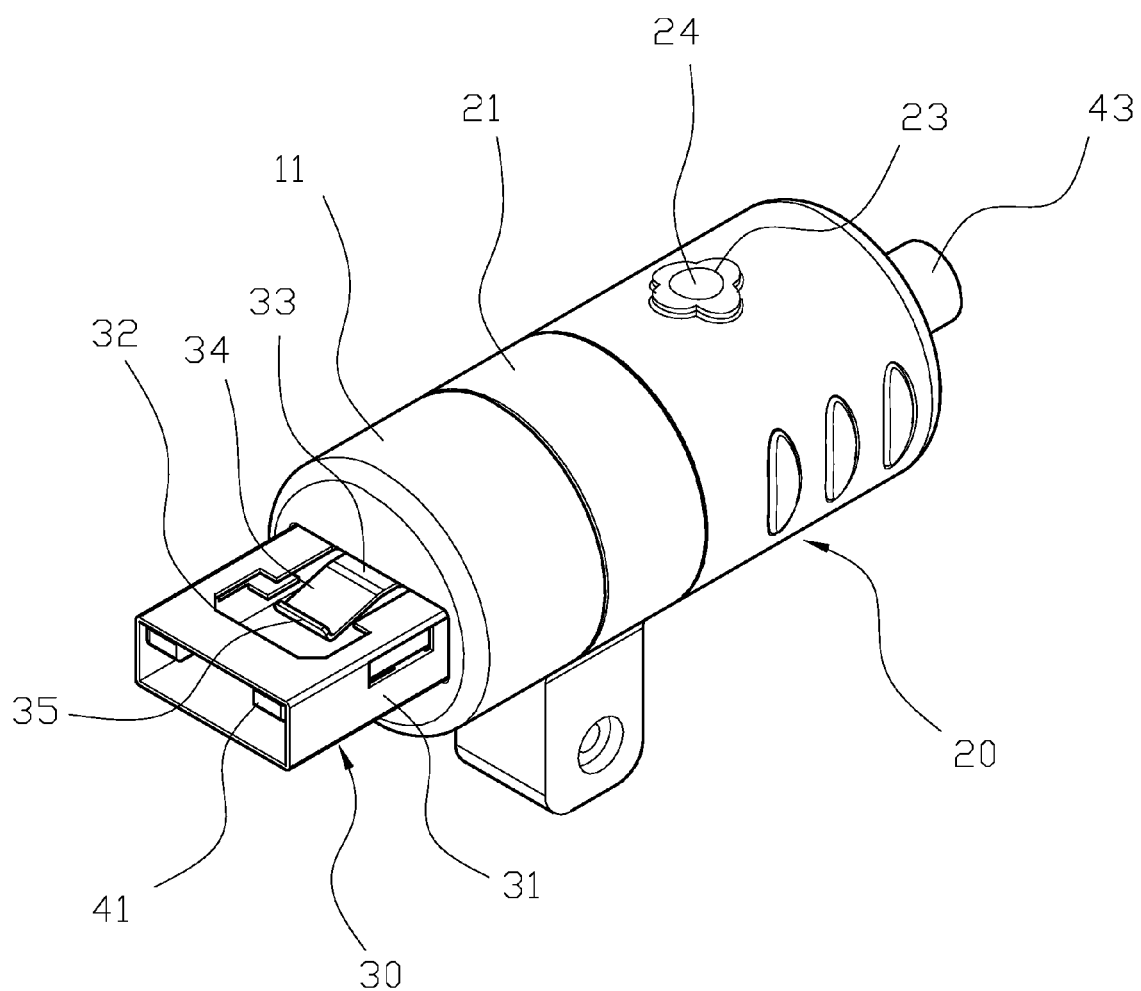
FIG. 1 is a three-dimensional assembly view of a USB lock for an electronic device in the present invention.
Figure 2:
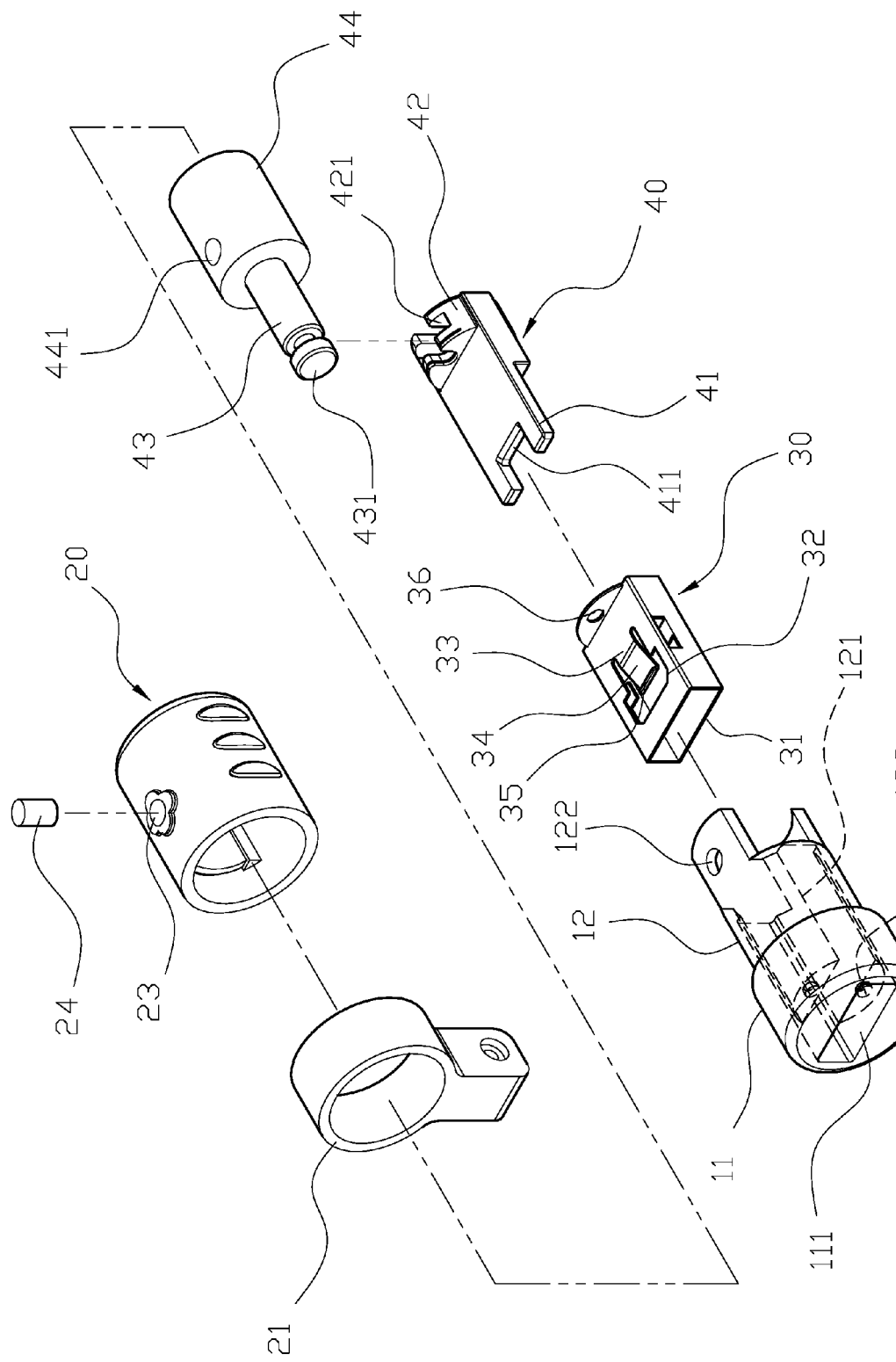
FIG. 2 is a three-dimensional exploded view of the USB lock for an electronic device in the present invention.
Figure 6:
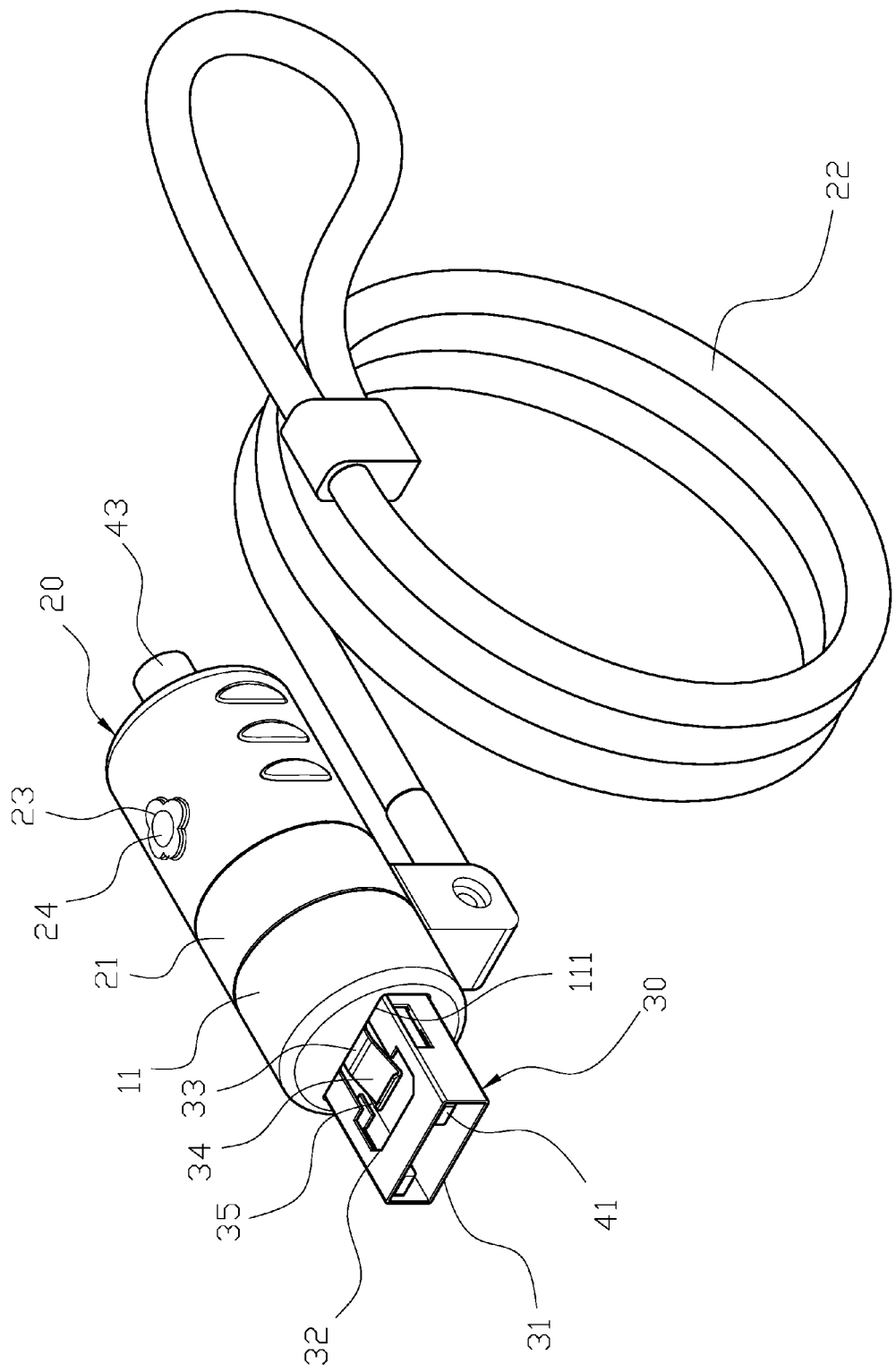
FIG. 6 is the third schematic view illustrating the USB lock for an electronic device in the present invention is in use.

In order to further understand the goal, characteristics and effect of the present invention, a number of embodiments along with the drawings are illustrated as following:

Referring to FIGS. 1 and 2, the present invention provides a USB lock for an electronic device which comprises an inner casing (10), an outer casing (20), a USB connector (30) and a driving unit (40). A head portion (11) is formed at a front end of the inner casing (10), and a front opening (111) is located at a front end of the head portion (11). A rear portion of the inner casing (10) has a tube body (12), and a first through hole (121) penetrating through the tube body (12) is communicated with the front opening (111). The tube body (12) further has a locating hole (122), and a protruding portion (123) protrudes from an inner surface of the first through hole (121). The outer casing (20) covers around an outer periphery of the tube body (12) of the inner casing (10), and a connecting ring (21) disposed on the tube body (12) is secured between the head portion (11) and the outer casing (20). Moreover, a locking cable (22) connected to the connecting ring (21) is configured to wind around an immovable object to achieve a burglarproof effect (as shown in FIG. 6). Furthermore, a first connecting hole (23) penetrating an outer periphery of the outer casing (20) is located a position aligned with the locating hole (122) of the inner casing (10), and a bolt (24) is inserted into the first connecting hole (23) and the locating hole (122) to secure the outer casing (10) around the tube body (12). The USB connector (30) is secured on the front opening (111) of the inner casing (10), and a square tube (31) of the USB connector (30) protrudes from a front end of the front opening (111). A first surface of the square tube (31) further comprises an actuated opening (32), and a bottom portion (33), a tilted portion (34) and a hooking member (35) are sequentially extended from an edge of the actuated opening (32). The bottom portion (33) is located at the same height level as the first surface of the square tube (31), and the tilted portion (34) is extended toward an interior space of the square tube (31). Moreover, the areas of the bottom portion (33) and the tilted portion (34) are in a ratio between 1:3 and 1:4, and the hooking member (35) is bent toward the actuated opening (32). Also, at least a second through hole (36) penetrating through a rear edge of the USB connector (30) is configured to engage with the protruding portion (123) of the inner casing (10) such that the USB connector (30) is firmly connected to the inner casing (10). A front end of the driving unit (40) comprises a lock piece (41) which is configured to locate inside the interior space of the USB connector (30), and an evading opening (411) penetrating through a first surface of the lock piece (41) is located at a position corresponding to the tilted portion (34) and the hooking member (35). A connecting portion (42) formed at a rear end of the driving unit (40) is configured to connect to a lock rod (43). Wherein the connecting portion (42) comprises a housing slot (421) which is configured to receive and engage with a block (431) of the lock rod (43) such that the lock rod (43) is configured to rotate relative to a rear end of the connecting portion (42) and to push or pull the driving unit (40). Furthermore, the lock rod (43) penetrates and connects to a key lock (44), and the lock rod (43) with the key lock (44) is secured inside the first through hole (121) of the inner casing (10). In addition, the key lock (44) further comprises a second connecting hole (441) which is configured to be inserted by the bolt (24) such that the key lock (44) is configured to control the axial movement of the lock rod (43), and the lock rod (43) is configured to drive the lock piece (41) to move inside the USB connector (30). Further, the lock piece (41) is configured to press the tilted portion (34) upwardly to reach the same height level as the bottom portion (33) such that the hooking member (35) protrudes from the first surface of the USB connector (30) to allow the USB lock of the present invention into a locked position. On the other hand, the USB lock of the present invention is in an unlocked position when the evading opening (411) is aligned with the tilted portion (34).

Figure 3:
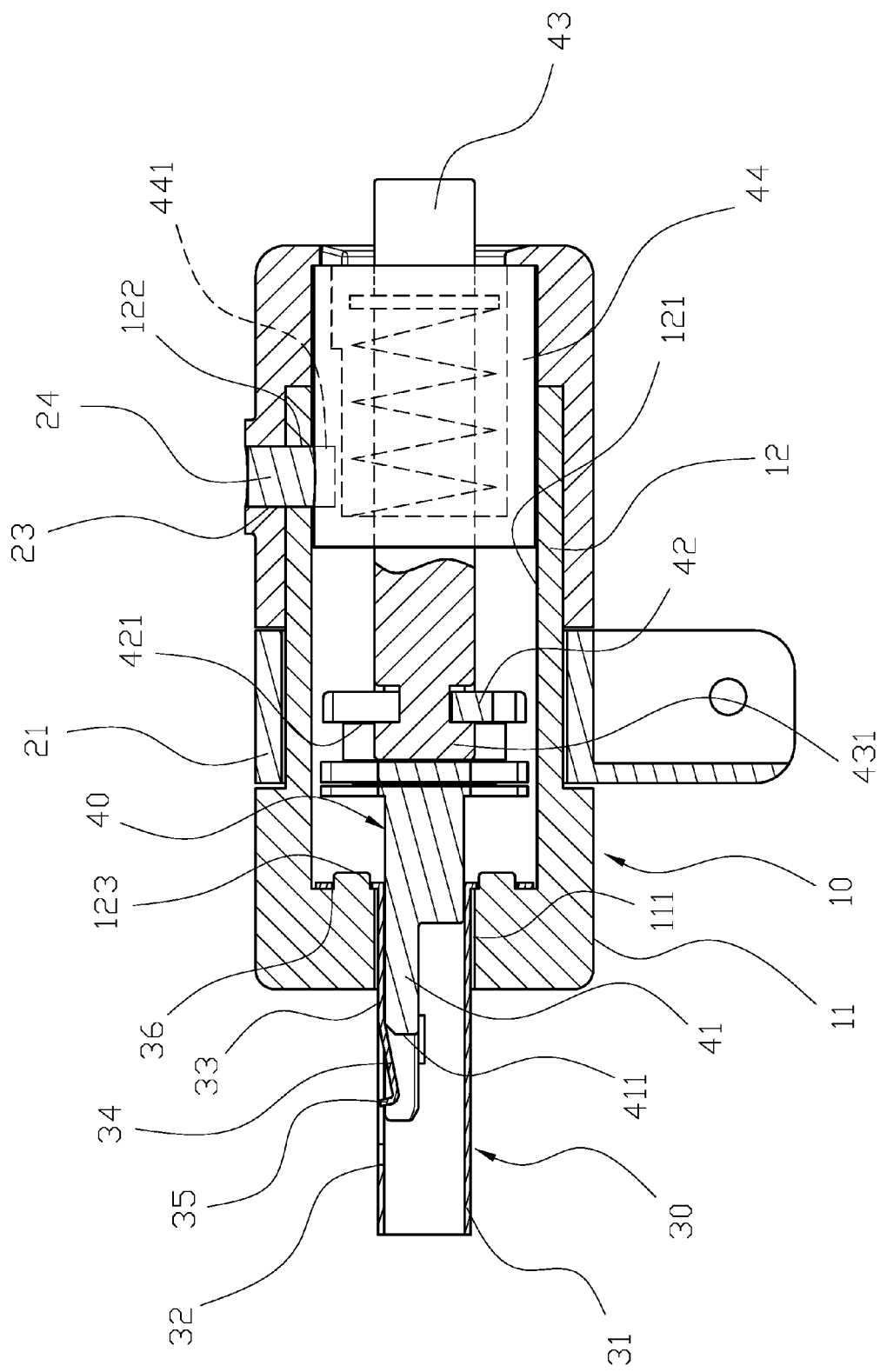
FIG. 3 is a sectional assembly view of the USB lock for an electronic device in the present invention.
Figure 4:
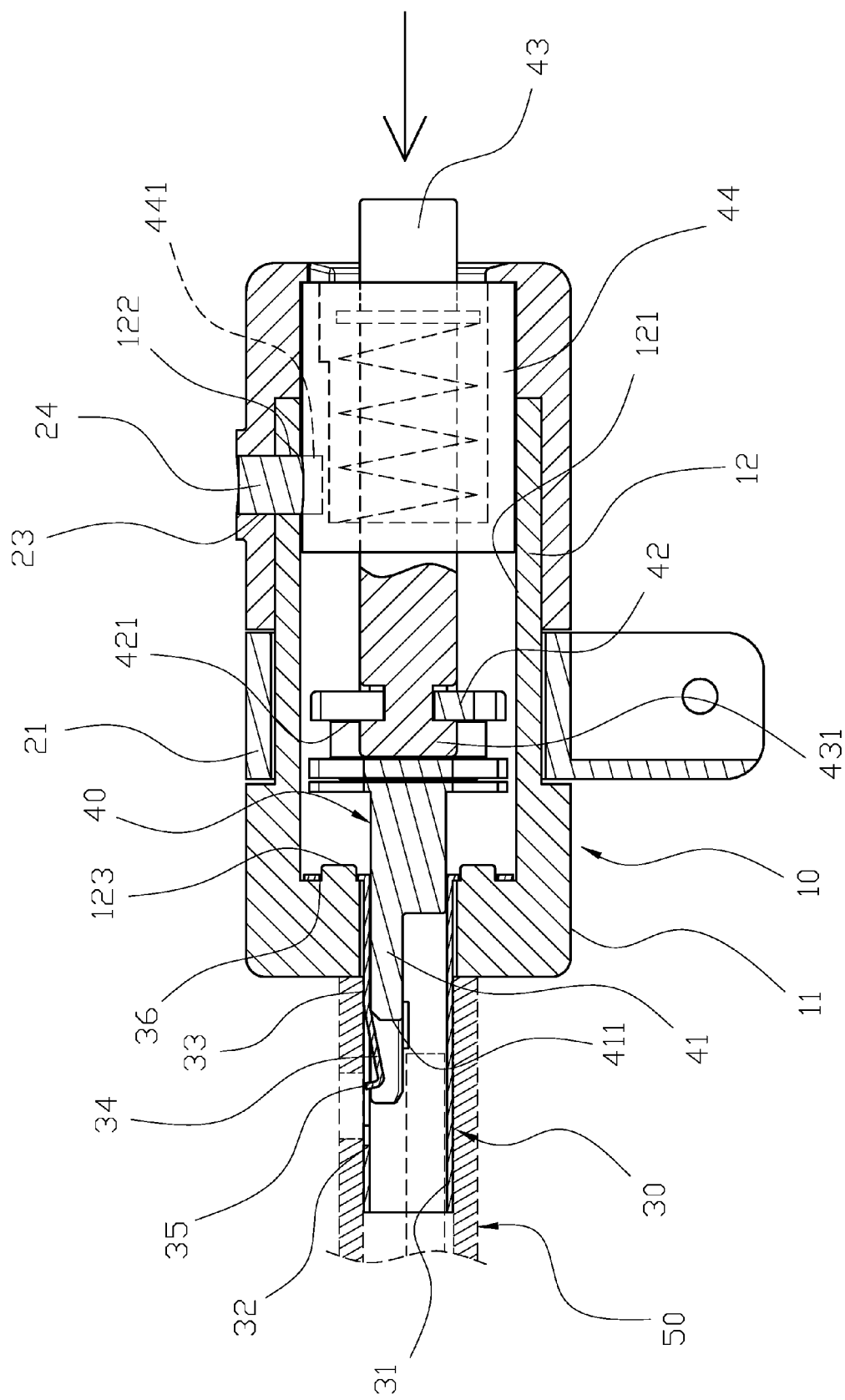
FIG. 4 is a schematic view illustrating the USB lock for an electronic device in the present invention is in use.
Figure 5:
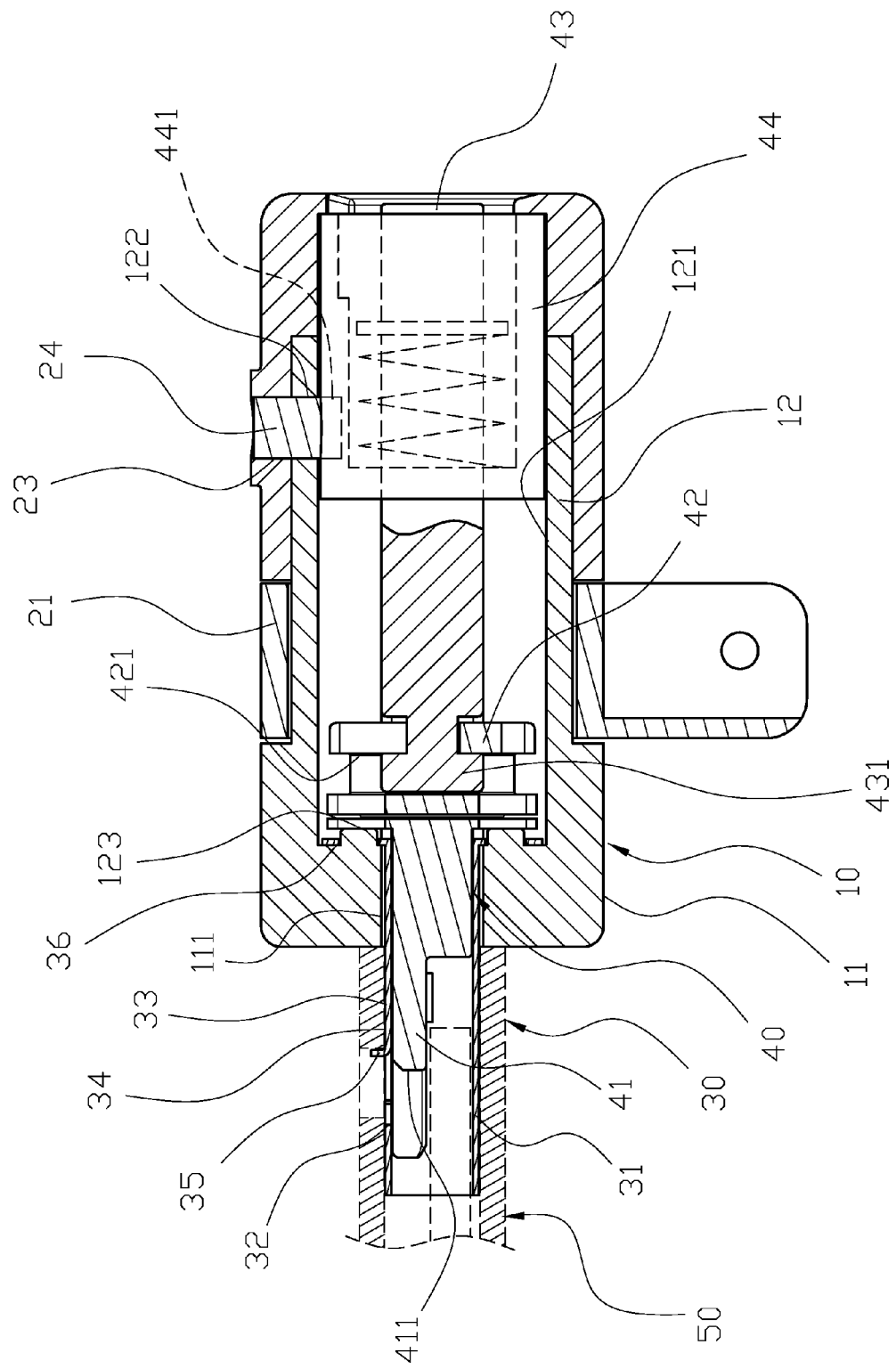
FIG. 5 is another schematic view illustrating the USB lock for an electronic device in the present invention is in use.

Structurally, referring to FIGS. 1 to 3, the lock piece (41) of the driving unit (40) is inserted into the interior space of the USB connector (30), and the block (431) of the lock rod (43) is engaged in the housing slot (421) of the connecting portion (42). The USB connector (30) with the driving unit (40), the lock rod (43) and the key lock (44) is inserted into the front opening (111) of the inner casing (10) through a front end of the USB connector (30) to allow a front portion of USB connector (30) with a front portion of the driving unit (40) to stick out from the front opening (11). Moreover, the protruding portion (123) of the inner casing (10) is connected to the second through hole (36) of the USB connector (30), and a rear portion of the USB connector (30), a rear portion of the driving unit (40), the lock rod (43) and the key lock (44) are received inside the first through hole (121) of the inner casing (10). Furthermore, the connecting ring (21) is disposed on the tube body (12) of the inner casing (10), and the outer casing (20) covers around an outer periphery of a rear portion of the tube body (12) to secure the connecting ring (21) between the head portion (11) of the inner casing (10) and the outer casing (20). Also, an outer edge of a rear end of the key lock (44) is borne against the outer casing (20) thus positioning locations of the driving unit (40) and the key lock (44), and the bolt (24) is inserted into the first connecting hole (23) of the outer casing (20), the locating hole (122) of the inner casing (10) and the second connecting hole (441) of the key lock (44) thus completing the assembly of the USB lock of the present invention.

In actual application, referring to FIGS. 2 to 6, in the unlocked position, the lock rod (43) is retracted toward the key lock (44), and a rear portion of the lock rod (43) sticks out from the rear end of the key lock (44). Also, the driving unit (40) driven by the lock rod (43) is moved to align the evading opening (411) of the lock piece (41) with the tilted portion (34) of the USB connector (30). As a result, the hooking member (35) is bent toward and keeps in the interior space of the USB connector (30) thereby allowing the USB connector (30) to insert into a USB port (50) of a 3C product. Then, a user can press the lock rod (43) with the key lock (44), and driving unit (40) is moved toward the USB connector (30) to push the lock piece (41) of the driving unit (40) toward the front opening (111). Thus, the tilted portion (34) pressed by the lock piece (41) is located at the same height level as the bottom portion (33) to allow the hooking member (35) to engage with the USB port (50). Then, through cooperating with the locking cable (22), the USB lock of the present invention is configured to achieve the anti-theft effect for a 3C product. On the contrary, when the key lock (44) is unlocked, the lock rod (43) with the driving unit (40) is retracted back to an initial position such that the tilted portion (34) is aligned with the evading opening (411) and the USB lock of the present invention gets back into the unlocked position.

Comparing with conventional 3C product locks, the present invention is advantageous because: (i) the USB lock of the present invention is configured to engage with the USB port (50) of a 3C product to achieve the anti-theft effect, which is easily to assembly, simplifies the structure and lowers manufacturing cost; (ii) through cooperating the USB connector (30) with the key lock (44), the USB lock of the present invention is configured to lock a 3C product, even the 3C product has no lock hole thereby improving the practicability and preventing the 3C product from getting infected with a virus through an unsafe USB; and (iii) since the design of the bottom portion (33), the tilted portion (34) and the hooking member (35) which are sequentially extended from the edge of the actuated opening (32) of the USB connector (30) and the areas of the bottom portion (33) and the tilted portion (34) are in the ratio between 1:3 and 1:4, the lock piece (31) is configured to push the tilted portion (34) with a greater distance thereby enhancing the durability and stability of operation.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A USB lock for an electronic device comprising:
   an inner casing comprising a head portion formed at a front end thereof, and a front opening located at a front end of the head portion; a rear portion of the inner casing having a tube body, and a first through hole, which penetrates through the tube body, communicated with the front opening, and the tube body having a locating hole;
   an outer casing covering around an outer periphery of the tube body of the inner casing, and a connecting ring, which is disposed on the tube body, secured between the head portion of the inner casing and the outer casing; a first connecting hole, which penetrates an outer periphery of the outer casing, located a position aligned with the locating hole of the inner casing, and a bolt inserted through the first connecting hole into the locating hole;
   a USB connector, which is secured on the front opening of the inner casing, having a square tube protruding from a front end of the front opening; a first surface of the square tube comprising an actuated opening, and a bottom portion, a tilted portion and a hooking member sequentially extended from an edge of the actuated opening, and the bottom portion located at the same height level as the first surface of the square tube, and the tilted portion extended toward an interior space of the square tube, and areas of the bottom portion and the tilted portion being in a ratio between 1:3 and 1:4, and the hooking member bent toward the actuated opening; and
   a driving unit having a lock piece, which is formed at a front end of the driving unit, located inside an interior space of the USB connector, and an evading opening, which penetrates through a first surface of the lock piece, located at a position corresponding to the tilted portion and the hooking member; a connecting portion, which is formed at a rear end of the driving unit, configured to connect to a lock rod which penetrates and connects to a key lock, and the lock rod together with the key lock secured inside the first through hole of the inner casing, and the key lock comprising a second connecting hole which is configured to be inserted by the bolt such that the key lock configured to control the axial movement of the lock rod to drive and move the driving unit inside the USB connector; the lock piece configured to press the tilted portion upwardly to reach the same height level as the bottom portion such that the hooking member protruding from the first surface of the USB connector to allow the USB lock into a locked position; the USB lock being unlocked when the evading opening aligned with the tilted portion of the USB connector to allow the hooking member to receive in the interior space of the USB connector.

2. The USB lock for an electronic device of claim 1, wherein a protruding portion protrudes from an inner surface of the first through hole of the inner casing, and at least a second through hole penetrating through a rear edge of the USB connector is configured to connect with the protruding portion such that the USB connector is firmly connected to the inner casing.

3. The USB lock for an electronic device of claim 1, wherein the connecting portion of the driving unit comprises a housing slot which is configured to receive and engage with a block of the lock rod such that the lock rod is configured to rotate relative to a rear end of the connecting portion and to push or pull the driving unit.

4. The USB lock for an electronic device of claim 1, wherein a locking cable configured to wind around an immovable object is connected to the connecting ring to achieve a burglarproof effect.

* * * * *